(12) United States Patent
Lindner et al.

(10) Patent No.: US 6,655,129 B2
(45) Date of Patent: Dec. 2, 2003

(54) PROCESS FOR OPERATING A THREE-WAY CATALYST THAT CONTAINS AN OXYGEN-STORAGE COMPONENT

(75) Inventors: Dieter Lindner, Hanau (DE); Jorg-Michael Richter, Frankfurt (DE); Egbert Lox, Hanau (DE); Thomas Kreuzer, Karben (DE); Martin Votsmeier, Maintal (DE); Lothar Mussmann, Offenbach (DE)

(73) Assignee: Umicore AG & Co. KG, Hanau-Wolfgang (DE)

( * ) Notice: Subject to any disclaimer, the term of this patent is extended or adjusted under 35 U.S.C. 154(b) by 0 days.

(21) Appl. No.: 10/056,814

(22) Filed: Jan. 24, 2002

(65) Prior Publication Data

US 2002/0121083 A1 Sep. 5, 2002

(30) Foreign Application Priority Data

Jan. 27, 2001 (DE) .......................... 101 03 772

(51) Int. Cl.⁷ ................................. F01N 3/00
(52) U.S. Cl. ........................... 60/277; 60/276; 60/285; 60/299
(58) Field of Search .................. 60/285, 276, 299, 60/277; 73/118.1, 23.31, 23.32

(56) References Cited

U.S. PATENT DOCUMENTS

| | | | |
|---|---|---|---|
| 4,024,706 A | | 5/1977 | Adawi et al. |
| 5,293,740 A | * | 3/1994 | Heppner et al. ............... 60/274 |
| 5,335,538 A | * | 8/1994 | Blischke et al. ............ 73/118.1 |
| 5,602,737 A | * | 2/1997 | Sindano et al. .............. 701/108 |
| 5,842,340 A | * | 12/1998 | Bush et al. ..................... 60/274 |
| 5,901,552 A | | 5/1999 | Schnaibel et al. |
| 6,161,428 A | * | 12/2000 | Esteghlal et al. .......... 73/118.1 |

* cited by examiner

Primary Examiner—Thomas Denion
Assistant Examiner—Diem Tran
(74) Attorney, Agent, or Firm—Kalow & Springut LLP (57) ABSTRACT

A process is provided for operating a three-way catalyst that contains an oxygen storage component, that has a minimum and a maximum filling degree for oxygen and that is located in the exhaust gas line of an internal combustion engine. The air/fuel mixture supplied to the engine is varied in such a way that the filling degree of the oxygen storage component in the catalyst is held within a set-point interval between the minimum and maximum filling degree. According to this process, in order to regulate the air/fuel mixture, migration of the filling degree out of the set-point interval is checked in a test phase in such a way that the filling degree is increased or lowered relative to the instantaneous value (initial value) by short-term enrichment or reduction in richness of the air/fuel mixture supplied to the engine by a certain amount and immediately returned to the initial value by a short-term opposing change in the air/fuel mixture (lean/rich pulse sequence or rich/lean pulse sequence). In the case of a breakthrough of lean or rich exhaust gas through the catalyst during the test phase, the air/fuel mixture is enriched or reduced in richness in order to correct the filling degree, wherein the amount by which the filling degree during the test phase is increased or decreased is such that no breakthrough of lean or rich exhaust gas takes place through the catalyst when the filling degree of the oxygen storage component is within the set-point interval.

16 Claims, 6 Drawing Sheets

PROCESS FOR OPERATING A THREE-WAY CATALYST THAT CONTAINS AN OXYGEN-STORAGE COMPONENT

FIELD OF THE INVENTION

The present invention relates to the field of internal combustion engines. More particularly, the present invention relates to the catalytic treatment of exhaust gases that are generated by internal combustion engines.

BACKGROUND OF THE INVENTION

Internal combustion engines generate exhaust gases when they burn air and fuel. The mixture of air and fuel used in internal combustion engines is called the "air/fuel mixture." The air/fuel mixture may be characterized in terms of an air/fuel ratio, which describes how many kilograms of air per kilogram of fuel are supplied to the internal combustion engine.

The normalized air/fuel ratio lambda ($\lambda$) is often used to describe the ratio of the components of the composition of this air/fuel mixture. Lambda refers to the air/fuel ratio normalized to stoichiometric conditions. The air/fuel ratio for stoichiometric combustion for conventional engine fuels is 14.7; the normalized air/fuel ratio lambda at this point is 1. Air/fuel ratios less than 14.7, or normalized air/fuel ratios less than 1, are called rich and air/fuel ratios greater than 14.7, or normalized air/fuel ratios greater than 1, are called lean.

During combustion of the air/fuel mixture, the internal combustion engine will generate harmful substances, such as carbon monoxide, hydrocarbons and nitrogen oxides. If no storage effects for certain components of the exhaust gas are present in the internal combustion engine, then the normalized air/fuel ratio of the exhaust gas corresponds to the normalized air/fuel ratio of the air/fuel mixture supplied to the engine.

In order to achieve a high degree of conversion for all three of the aforementioned harmful substances in exhaust gases, the normalized air/fuel ratio needs to be set within a very narrow range around $\lambda=1$ (stoichiometric condition). The interval around $\lambda=1$ within which at least 80% of all three harmful substances are converted is often called the lambda window. To remain within the lambda window, the normalized air/fuel ratio may be adjusted with the aid of the signal from an oxygen sensor (lambda sensor). A two-point lambda sensor is usually used for this purpose. Due to the unavoidable inertia of the control system, this two-point regulation leads to modulation of the normalized air/fuel ratio with a frequency of about 1 Hz. Modulation of the normalized air/fuel ratio can be largely avoided by the use of a linear lambda sensor.

In order to treat exhaust gases from stoichiometrically operated internal combustion engines, one may use one or more catalysts. One type of catalyst that may be used is the three-way catalyst, which can simultaneously remove carbon monoxide, hydrocarbons and nitrogen oxides from the exhaust gas.

In order to prevent impairment of catalyst efficiency due to modulation of the normalized air/fuel ratio or by short-term variations in the normalized air/fuel ratio, modern three-way catalysts contain oxygen storage components (OSC), which store oxygen in the presence of a lean exhaust gas ($\lambda>1$) and release oxygen in the presence of a rich exhaust gas ($\lambda<1$). Thus, they adjust the stoichiometry of the exhaust gas to $\lambda=1$. Any compounds that permit a change in their oxidation state are suitable as oxygen storage components in a catalyst. Cerium oxide, which can be present either as $Ce_2O_3$ or as $CeO_2$, is most frequently used.

In the present disclosure, the storage capacity of the oxygen storage component refers to the mass of oxygen that can be absorbed per gram of oxygen storage component. Accordingly, the momentary "filling degree" is defined as the ratio of the mass of oxygen actually stored to the storage capacity. The storage capacity of an oxygen storage component can be determined experimentally by various processes that are known to persons skilled in the art.

By regulating the normalized air/fuel ratio, one is able to avoid complete filling or complete depletion of the oxygen storage component. In the case of complete filling of the catalyst with oxygen, breakthrough by lean exhaust gas takes place, and this leads to the emission of nitrogen oxides. In the case of complete depletion, breakthrough by rich exhaust gas takes place and this leads to emissions of carbon monoxide and hydrocarbons. According to U.S. Pat. No. 4,024,706, the lambda window for three-way catalysts with oxygen storage components can be enlarged by suitable modulation of the air/fuel ratio. U.S. Pat. No. 4,024,706 is incorporated by reference herein. The modulation amplitude of the air/fuel ratio is preferably chosen to be less than 1, and the modulation frequency is preferably chosen to be greater than 1 Hz. If the modulation frequency is too low, there is a risk that the storage capacity of the oxygen storage might be exceeded during the lean half cycle of modulation and lean exhaust gas then would break through the catalyst.

Regulating the normalized air/fuel ratio with a single lambda sensor upstream of the catalyst does not enable the stoichiometry of the exhaust gas to be adjusted with sufficiently high precision in order to avoid complete depletion or filling of the oxygen storage components over the long-term. For this reason, more recent motor vehicles are fitted with a second lambda sensor downstream of the catalyst that detects the breakthrough of rich or lean exhaust gas and counteracts it. This is called "lead control." However, the "lead control" system detects complete filling or depletion of the oxygen storage components only when the breakthrough of rich or lean exhaust gas has already taken place. Thus, depending on the reaction time of the control mechanism, a significant release of harmful substances is unavoidable.

According to DE 196 06 652 A1 (U.S. Pat. No. 5,901, 552), which is incorporated by reference herein, the air/fuel ratio supplied to an internal combustion engine may be varied in such a way that the filling degree of the oxygen storage in a three-way catalyst is always located between an upper and a lower limit. To implement this control system, the oxygen content in the exhaust gas upstream and downstream of the catalyst is measured and the measured values are evaluated with the aid of a mathematical model. In this way, the catalyst can, at any time, detect an unexpected occurrence of lean or rich deviations in the exhaust gas and thus avoid the breakthrough of emissions. The disadvantage of this system is that, over a long operating period, an increasing difference between the actual filling degree and the theoretically determined filling degree can occur.

The object of the present invention is to provide a process for regulating the filling degree of the oxygen storage component within a predetermined set-point interval on the basis of measurements of the normalized air/fuel ratio of the exhaust gas upstream and downstream of the catalyst.

SUMMARY OF THE INVENTION

The present invention provides a process for operating a three-way catalyst that contains an oxygen storage component that has a minimum and maximum filling degree for oxygen and that is located in the exhaust gas line of an internal combustion engine. According to this process, the air/fuel mixture supplied to the engine is varied in such a way that the momentary filling degree of the oxygen-storage component in the catalyst is held within a set-point interval between the minimum and maximum filling degree.

According to the present invention, in order to regulate the air/fuel mixture, migration of the filling degree out of the set-point interval is checked in a test phase in such a way that the filling degree is increased or lowered relative to the instantaneous value (initial value) by short-term enrichment or reduction in richness of the air/fuel mixture supplied to the engine by a certain amount and immediately returning to the initial value by a short-term opposing change in the air/fuel mixture (lean/rich pulse sequence or rich/lean pulse sequence).

In the case of a breakthrough of lean or rich exhaust gas through the catalyst during the test phase, the air/fuel mixture is enriched or reduced in richness in order to correct the filling degree. The amount by which the filling degree during the test phase is increased or decreased is such that no breakthrough of lean or rich exhaust gas takes place through the catalyst when the filling degree of the oxygen storage component is within the set-point interval. Thus, the present invention provides a process for operating a three-way catalyst by regulating an air/fuel mixture supplied to an internal combustion engine, wherein said three-way catalyst comprises an oxygen storage component and said oxygen storage component comprises a minimum filling degree and a maximum filling degree for oxygen and said oxygen storage component further comprises a set-point interval, said process comprises:

a. initiating a test phase, wherein said test phase comprises applying a pulse sequence to change a filling degree of the oxygen component, wherein said filling degree has an initial value and said pulse sequence either enriches or reduces the richness of the air/fuel mixture supplied to the engine by a certain amount to raise or to lower said initial value and then returns the filling degree to said initial value by applying a pulse in the opposite direction; and b. determining whether there was a breakthrough of lean or rich exhaust gas through the catalyst during said pulse sequence.

BRIEF DESCRIPTION OF THE FIGURES

The invention is explained in more detail using FIGS. 1 to 8. The figures are briefly described below:

FIG. 1.

FIG. 2.

FIG. 3.

FIG. 4.

FIG. 5.

FIG. 6.

FIG. 7.

FIG. 8.

DETAILED DESCRIPTION OF THE INVENTION

According to the present invention, the composition of the air/fuel mixture supplied to an internal combustion engine is varied, preferably with the aid of an oxygen sensor that is located in the exhaust gas line upstream of the catalyst. The possible breakthrough of lean or rich exhaust gases through the catalyst is determined, preferably with a second oxygen sensor that is located in the exhaust gas line downstream of the catalyst. When a breakthrough is detected, the air/fuel mixture composition may be appropriately adjusted.

The invention will now be described in connection with preferred embodiments. These embodiments are presented in order to aid in an understanding of the present invention and are not intended, and should not be construed, to limit the invention in any way. All alternatives, modifications and equivalents that may become obvious to persons of ordinary skill on reading the disclosure are included within the spirit and scope of the present invention. Further, this disclosure is not intended to be a treatise on exhaust gas treatment or on internal combustion engines. Readers are referred to appropriate available texts as necessary.

Figure 1:
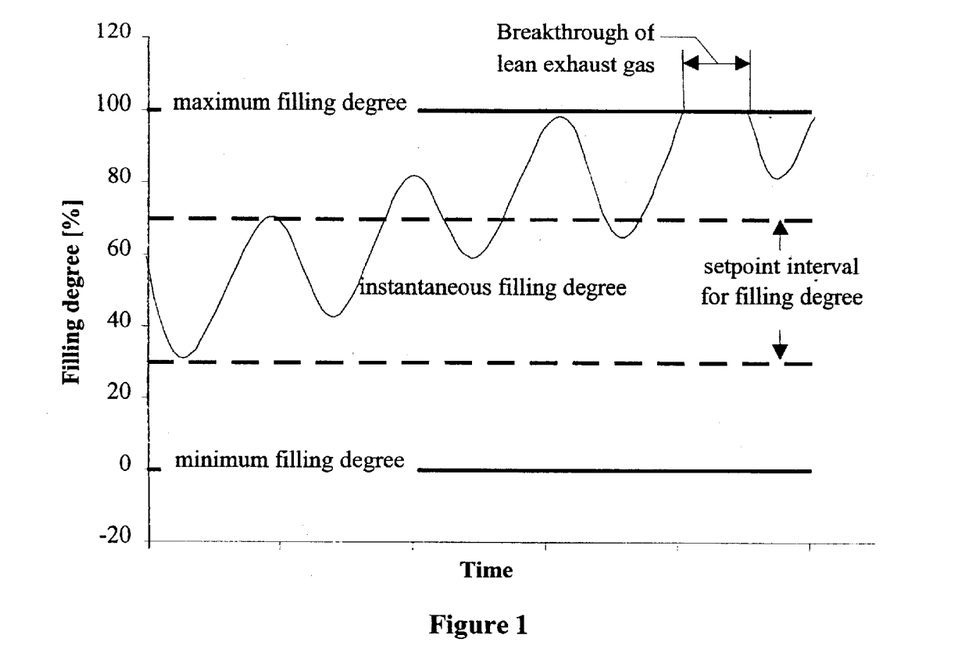
FIG. 1 is a representation of the characteristics of the filling degree of the oxygen storage component in a catalyst over time.

The frequently observed characteristics of the filling degree of an oxygen storage component in a three-way catalyst as a function of time, are well known to persons skilled in the art and depicted in FIG. 1. The minimum and maximum filling degrees are shown by solid horizontal lines. The set-point interval for the filling degree is limited by dashed lines in FIG. 1. As is known to persons skilled in the art, a set-point interval is not an inherent characteristic of an oxygen storage component, and may be defined by methods known to persons skilled in the art.

It should be understood here that the maximum filling degree does not necessarily coincide with the storage capacity of the oxygen storage component of the catalyst. For practical reasons the maximum filling degree is deliberately set to a value below the value that corresponds to the storage capacity. The same holds true for the minimum filling degree, which will be set to a value above that which corresponds to complete depletion of the oxygen storage component.

The filling degree of the oxygen storage component substantially follows the modulation of the air/fuel mixture supplied to the internal combustion engine. Due to ageing of the oxygen sensor located upstream of the catalyst, the filling degree may migrate out of the intended set-point interval and finally reaches the maximum or minimum filling degree. A further increase or decrease in the filling degree proceeds only slowly and can be neglected for all practical purposes. In FIG. 1, these characteristics are shown in an idealized form by capping modulation of the filling degree at the limiting line for the maximum filling degree. In this region, the catalyst can no longer store excess oxygen, and there is a breakthrough of lean exhaust gas through the catalyst.

The filling degree of the oxygen storage component can be adjusted via the stoichiometry of the exhaust gas. It is important, for optimum functioning of the three-way catalyst, to detect in good time, any migration of the filling degree out of the set-point interval in order to be able to bring the filling degree back into the set-point interval again.

According to the present invention, in order to check the instantaneous filling degree, the filling degree is briefly increased or decreased by means of a lean pulse or a rich pulse. The expressions "lean pulse" and "rich pulse" in the context of this invention are understood to refer to the short-term increase or decrease in the air/fuel ratio. This takes place with the aid of the engine control system, which briefly enriches the air/fuel mixture, or reduces it in richness. It is important for the process according to the present invention that the amount of enrichment or reduction in richness is immediately compensated for by a corresponding opposing change in the air/fuel ratio so that after completing the test phase, the momentary filling degree is again returned to the initial value at the start of the test phase. Thus, a rich pulse must follow a lean pulse and vice versa.

The actual shape of the pulse is of lesser significance in the process. For better understanding of the invention, however, idealized rectangular pulses are used in FIGS. 2 to 5.

Figure 2:
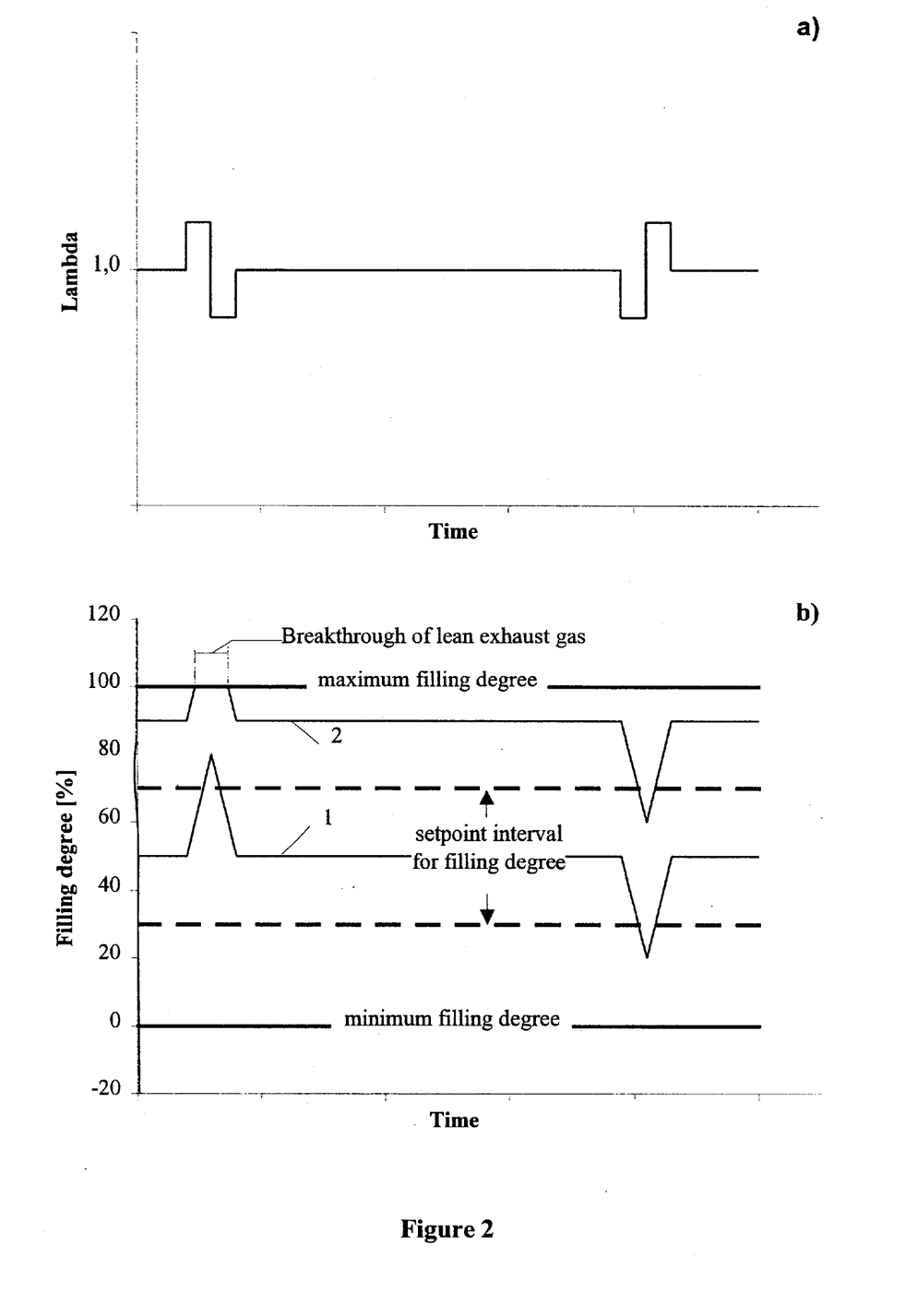
FIG. 2 is a representation of checking for possible migration of the filling degree of the oxygen storage component out of the set-point interval with a lean/rich pulse sequence and a rich/lean pulse sequence and adjusting the normalized air/fuel ratio between test phases to a constant value.

FIG. 2 explains the catalyst checking procedure. Diagram 2*a* shows the change in normalized air/fuel ratio of the exhaust gas before entering the three-way catalyst, whereas diagram 2*b* shows the relevant change in filling degree of the oxygen storage component in the catalyst.

To check the relative position of the instantaneous filling degree with respect to the maximum filling degree, the normalized air/fuel ratio is first increased for a short time and then immediately lowered by the same amount (lean/rich pulse sequence). In diagram 2*a* the lean pulse and the corresponding counter-pulse (rich pulse) are shown in idealized form as rectangular pulses. Curve 1 in diagram 2*b* shows the corresponding change in filling degree in the event that the instantaneous filling degree is located in the middle of the set-point interval. In this case, the change in instantaneous filling degree is the same as the integral of the change in normalized air/fuel ratio, that is the filling degree increases linearly during the lean phase and is returned to the initial value by the corresponding counter-pulse. Since the filling degree still does not reach the maximum filling degree, the normalized air/fuel ratio of the exhaust gas downstream of the catalyst remains unchanged with a value of 1. This situation changes only when the instantaneous filling degree has moved, for example, upwards out of the set-point interval due to faulty functioning. This situation is shown by curve 2. The lean pulse causes the filling degree to increase to its maximum value, at least for a short period. During this short time interval, the catalyst cannot store any more oxygen and there is a breakthrough of lean exhaust gas through the catalyst. To check the relative position of the instantaneous filling degree with respect to the minimum filling degree, the reverse procedure is used. The relative position with respect to the minimum filling degree is checked with an inverted pulse sequence, which is a rich/lean pulse sequence.

If a breakthrough of lean exhaust gas through the catalyst is detected downstream of the catalyst during the lean/rich pulse sequence, then a correction is made to the filling degree by briefly enriching the air/fuel mixture supplied to the engine (corrective step). A corresponding procedure is used in the event of a breakthrough of rich exhaust gas through the catalyst during a rich/lean pulse sequence. In addition to this short-term correction to the filling degree, the need for a correction detected in the test phase can be used to adjust the parameter for regulating the air/fuel ratio (lambda control) so that any migration out of the set-point interval can be slowed down.

The area under the pulse that is its integral over time with respect to the normalized air/fuel ratio 1.0 determines the amount by which the filling degree is increased or decreased during the test. In the case of a lean pulse, this area is, for example, a measure of the volume of oxygen passed over the catalyst during the test. Therefore, in the following, reference is also made to the volume of the test pulse. These volumes should be chosen so that the change in filling degree brought about thereby still just does not reach the maximum or minimum filling degree when the instantaneous value for the filling degree is within the set-point interval for the filling degree.

As described above, the actual shape of the pulse used for the proposed process is of little importance. This also applies to the manner in which the requisite volume of the pulse is provided, that is to say the area that is enclosed with the line for the normalized air/fuel ratio 1. Thus, the volume required can be formed by a very short but high pulse or by a long and low pulse. The lower limit of the length of time of the pulse is given by the enrichment, or reduction in richness, of the air/fuel mixture for only one cylinder in the internal combustion engine. The maximum height of the pulse depends on the type of construction of the engine.

Checking the filling degree in accordance with the proposed method causes an increase in fuel consumption. This increase in fuel consumption is causally linked to the storage capacity of the oxygen storage components and the width of the set-point interval, which corresponds to the volume of pulse required for the test. The increase in fuel consumption is therefore, to a first approximation, independent of the shape of pulse used and the duration of pulse chosen.

The test is preferably repeated at certain intervals. To minimize the increase in fuel consumption required by the test procedure, it is therefore important to choose a frequency of test phases that is as low as possible while remaining effective. The frequency can be constantly adjusted to the current operating status by the engine management system. Thus, for example, in a driving situation with sudden accelerations, the tests are preferably performed more often than when driving at constant speeds. Determining the optimum frequency can be performed, for example, by using an appropriate mapping, a neuronal network or a fuzzy logic system. In addition, the need for a correction, as detected during a test phase, can also be used to adjust the control parameters for adjusting the air/fuel ratio (lambda regulation) to the measured deviation so that the speed at which the filling degree migrates out of the set-point interval is reduced. The interval between two test phases can be extended with the aid of an intelligent engine management system.

Furthermore, there is the possibility of combining the proposed process with the process described in DE 196 06 652 A1, which is incorporated by reference herein. The differences between the current status of the filling degree and the mathematical model detected in the test phases, can then be used to replace the filling degree used in the calculation by the actual filling degree. Too great a difference being produced between the calculated and the actual filling degree due to the accumulation of small errors during integration of the model equations can be avoided in this way. In addition, the differences between the current status and the mathematical model can be used for fine corrections to the parameters in the mathematical model. A further reduction in the frequency of test phases can be achieved in this way.

As already explained, the possible migration upwards of the filling degree out of the set-point interval can be checked by a lean/rich pulse sequence and a migration downwards can be checked by a rich/lean pulse sequence. In order to perform both checks while the engine is running, it is sensible to invert each pulse sequence in test phases that follow each other so that a rich/lean pulse sequence follows a test using a lean/rich pulse sequence. Such alternating test phases are shown in FIG. 2, diagram a.

Figure 3:
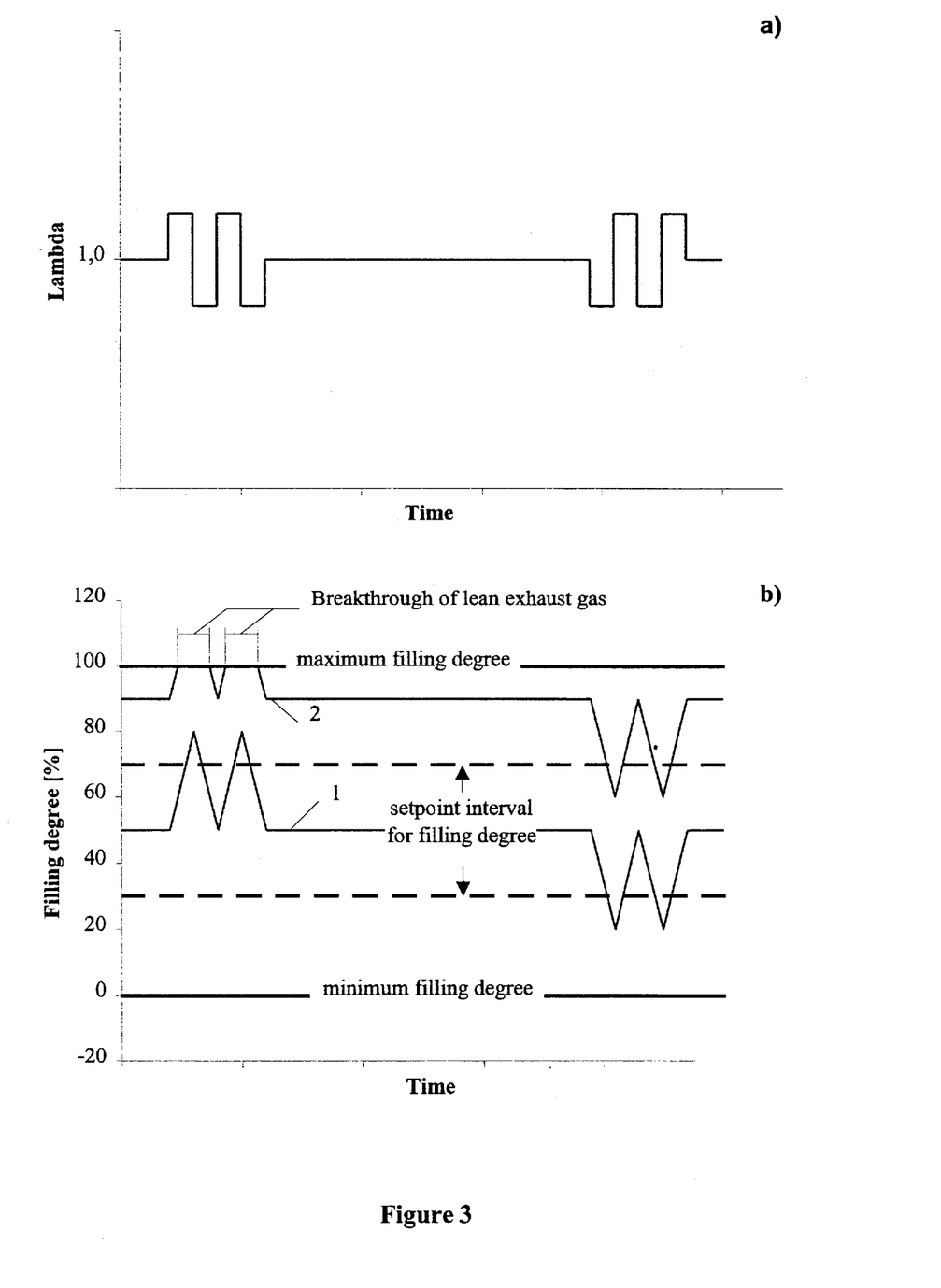
FIG. 3 is a representation of checking for possible migration of the filling degree of the oxygen storage component out of the set-point interval using a double lean/rich and double rich/lean pulse sequence and adjusting the normalized air/fuel ratio between the test phases to a constant value.
Figure 4:
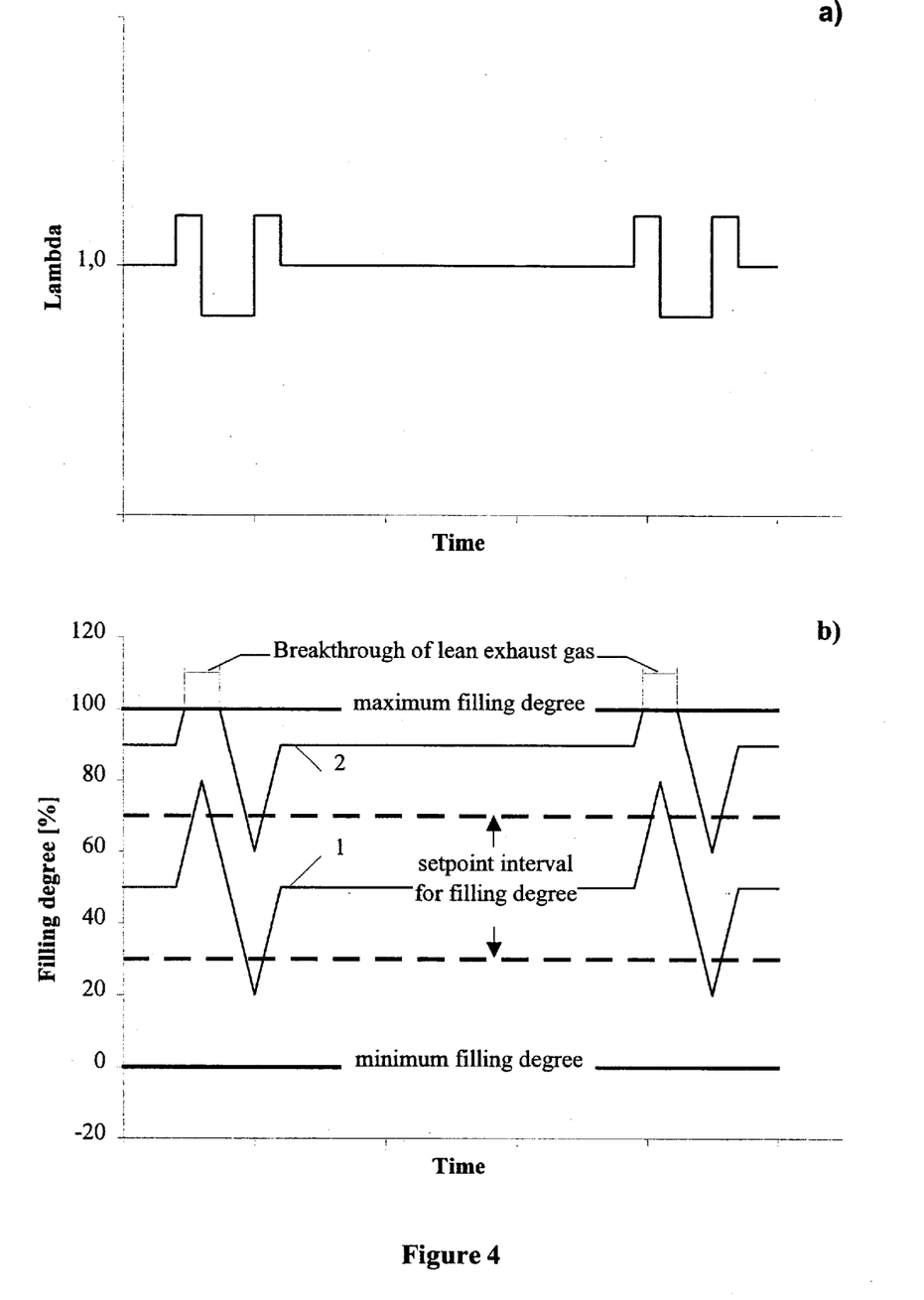
FIG. 4 is a representation of checking for possible migration of the filling degree of the oxygen storage component out of the set-point interval using a lean/rich/lean pulse sequence, wherein the rich pulse lasts for twice as long as one lean pulse.
Figure 5:
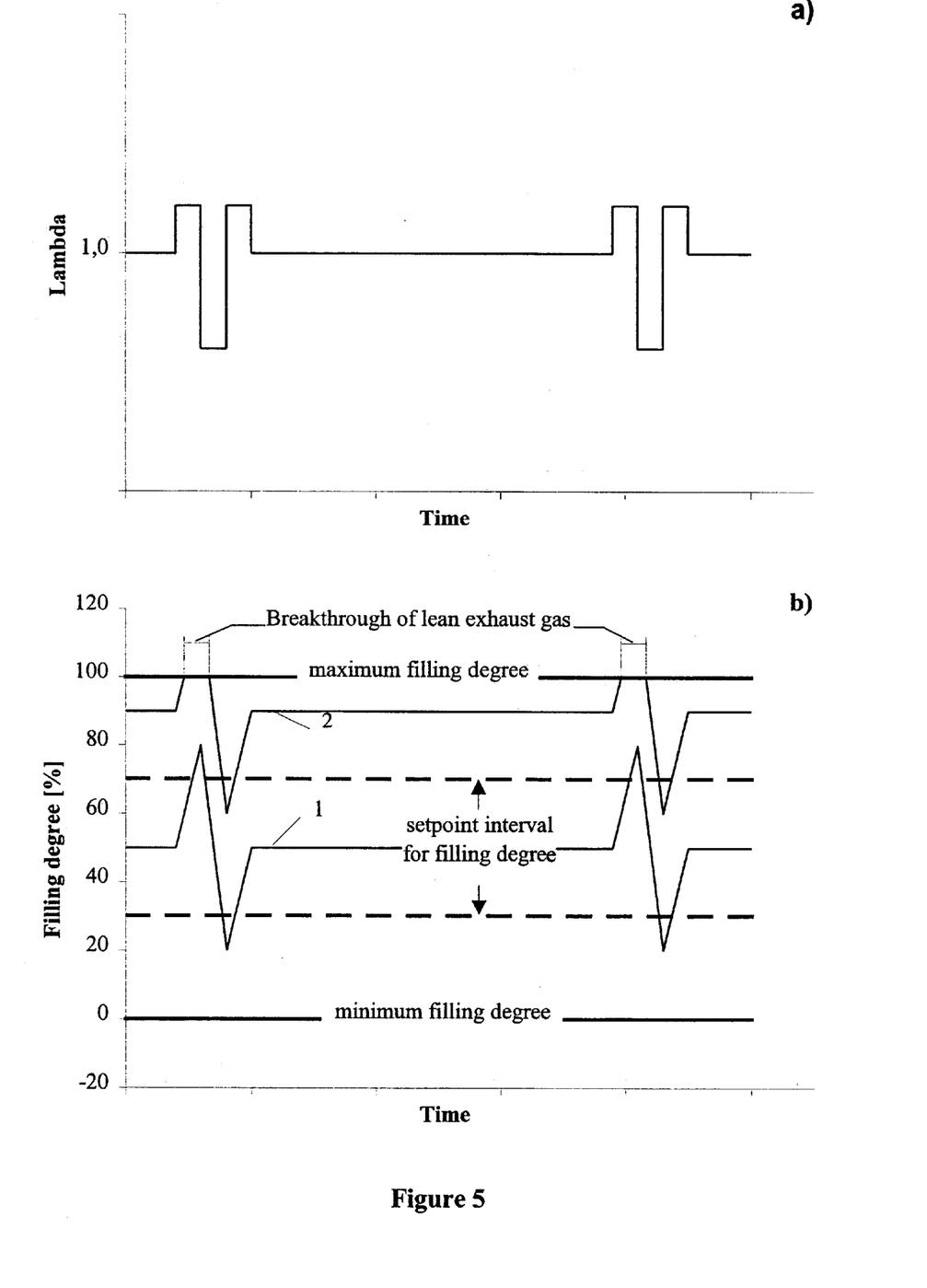
FIG. 5 is a representation of checking for possible migration of the filling degree of the oxygen storage component out of the set-point interval using a lean/rich/lean pulse sequence with the same time interval for all three pulses.

FIG. 3 shows two alternating test phases and the associated variation in filling degree in the event that the chosen pulse sequence is doubled within one test phase in order to improve the detectability of migration of the filling degree out of the set-point interval. Multiple repetition of the chosen pulse sequence within one test phase is also possible here. However, the increase in fuel consumption is correspondingly higher here, so the number of repeat tests should be restricted to a maximum of 5.

The process is organized in a particularly advantageous way when two sequential, alternating test phases are combined into a single test phase so that migration of the filling degree out of the set-point interval, both upwards and downwards, is checked within one test phase. In this case, two different pulse sequences are possible, but they provide equivalent results: on the one hand a lean/rich/lean pulse sequence and on the other hand a rich/lean/rich pulse sequence. The duration and height of each middle pulse must be such that the filling degree after completing the test phase is returned again to the initial value before the start of the test, that is to say the volume of the middle pulse must be as large as that of the two outer pulses together. This can be achieved either by doubling the duration (see FIG. 4) or by doubling the amplitude of the middle pulse (see FIG. 5). As was shown when discussing the importance of the shape of the pulse, any intermediate shapes of the middle pulse are also possible, provided the condition of returning the filling degree to its initial value after completing the test phase is complied with.

Figure 6:
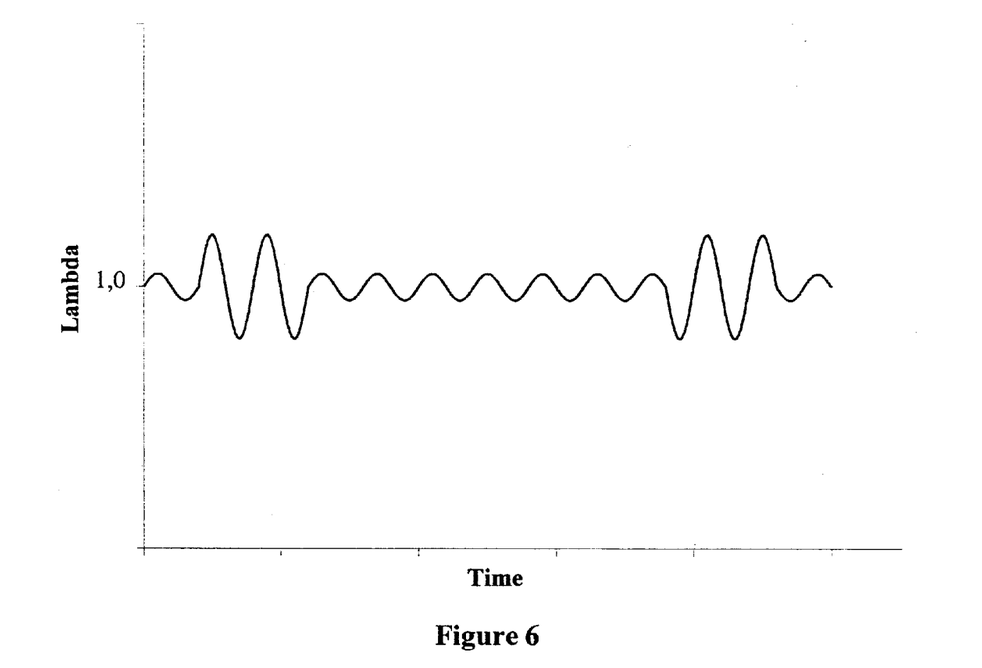
FIG. 6 is a representation of checking for possible migration of the filling degree of the oxygen storage component out of the set-point interval using a double lean/rich and double rich/lean pulse sequence and sinusoidal modulation of the air/fuel ratio between the test phases.
Figure 7:
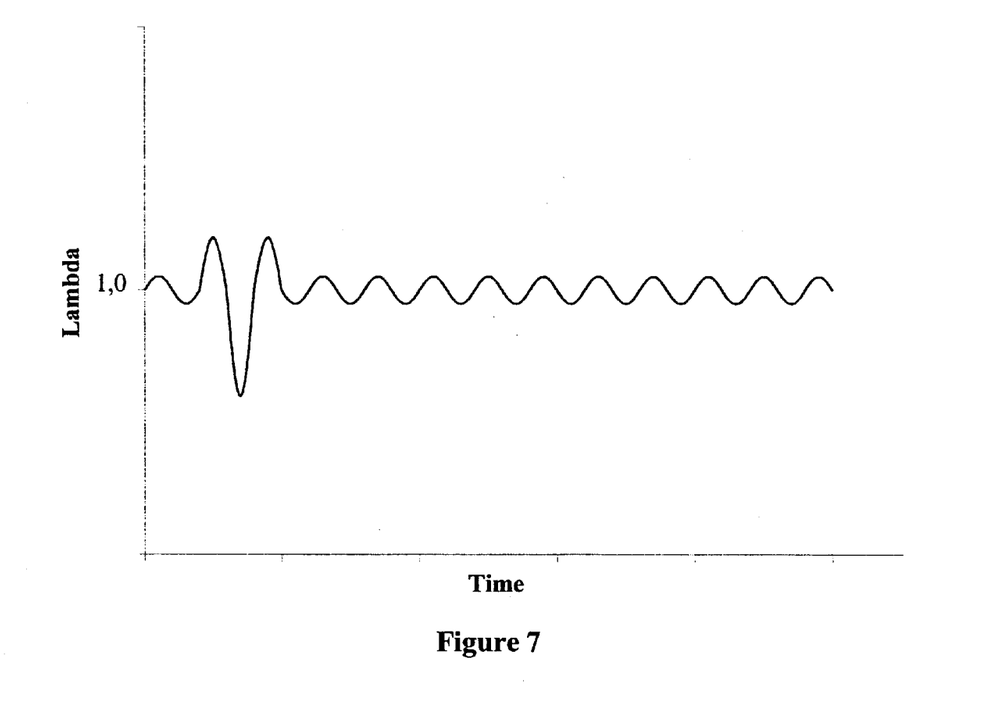
FIG. 7 is a representation of checking for possible migration of the filling degree of the oxygen storage component out of the set-point interval with a lean/rich/lean pulse sequence and sinusoidal modulation of the air/fuel ratio between the test phases.

The proposed process can be used either in combination with controlling the air/fuel ratio normalized to stoichiometric conditions, lambda, to a constant value of about $\lambda=1$ or in combination with modulation of the air/fuel ratio. In the first case, the normalized air/fuel ratio, lambda, is adjusted between two sequential test phases to the constant value, whereas in the second case, the air/fuel ratio is modulated between two sequential test phases using a frequency between 0.1 and 5 Hz and an amplitude between ±0.1 and ±2.0. The pulse sequences used in the test phases are then adjusted to the period of the modulation and superimposed correctly in line with the phases of the modulation in an expedient manner. This procedure is shown, for example, in FIGS. 6 and 7.

Figure 8:
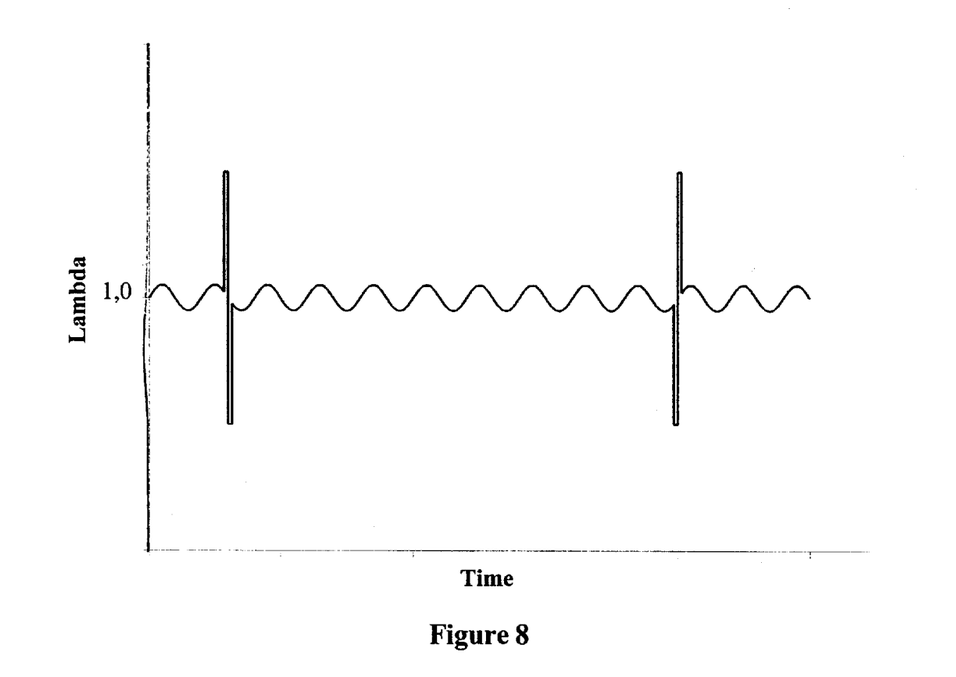
FIG. 8 is a representation of checking for possible migration of the filling degree of the oxygen storage component out of the set-point interval using a spike-shaped pulse sequence and sinusoidal modulation of the air/fuel ratio between the test phases.

FIG. 8 shows another embodiment of the claimed process. The air/fuel mixture supplied to the engine is again modulated sinusoidally between test phases in accordance with FIGS. 6 and 7. The test phases then correspond to those in FIG. 2, with the difference that the relatively broad and low test pulses have been replaced by spike-shaped pulses, that is by very narrow but high pulses. Naturally, the condition that the volume must be adjusted to the storage capacity of the catalyst also applies to spike-shaped test pulses. The duration of the spike pulse used in the test phases is preferably between 1 and 50% of the period of modulation of the air/fuel ratio. Expediently, the test phases are then initiated when the filling degree has reached its maximum or minimum value as result of the sinusoidal modulation. This is the case at the turning points on the modulation curve. The test phase with the lean/rich pulse sequence is thus superimposed, for example, on the air/fuel ratio when the air/fuel ratio passes through a turning point with a negative gradient and the filling degree has thus reached its maximum value. Accordingly, the reverse procedure takes place with a rich/lean pulse sequence.

With increasing ageing of the catalyst, the storage capacity is reduced. Thus, the interval between the minimum and maximum filling degree and the corresponding limits of the set-point interval are reduced. Thus, with increasing ageing of the catalyst, the volume of the test pulses have to be reduced. The requisite adjustment can be performed automatically. For this, the engine management system records how frequently breakthroughs by lean and rich exhaust gas occur directly one after the other. If such double breakthroughs are recorded too frequently, this is a sign of a reduced storage capacity in the catalyst and the volume of the test pulse must be reduced. With increasing damage to the oxygen storage capacity in the catalyst, the width of the set-point interval may also be reduced.

In the same way as the volume of the test pulse, the amplitude of the corrective step must also be adjusted after a breakthrough by lean or rich exhaust gas has been detected. As a result of the corrective step, the instantaneous filling degree should be brought back to the middle of the set-point interval.

Moreover, use of automatic adjustment of the volume of the test pulse is suitable for deciding when the catalyst needs to be replaced due to increasingly severe damage to its storage capacity. For this purpose, a minimum volume is fixed for the test pulses. The volume of the test pulses is reduced to the minimum volume as the catalyst suffers more and more damage. When the minimum volume of the test pulse has been reached, then a signal to replace the catalyst is triggered.

What is claimed:

1. A process for operating a three-way catalyst located in an exhaust gas line by regulating an air/fuel mixture supplied to an internal combustion engine, wherein said three-way catalyst comprises an oxygen storage component and said oxygen storage component comprises a minimum filling degree and a maximum filling degree for oxygen and said oxygen storage component further comprises a set-point interval, said process comprising:

a. initiating a test phase, wherein said test phase comprises applying a pulse sequence to change a filling degree of the oxygen storage component, wherein said filling degree has an initial value and said pulse sequence either enriches or reduces the richness of the air/fuel mixture supplied to the engine by a certain amount to raise or lower said initial value and returns the filling degree to said initial value by applying a pulse in the opposite direction;

b. determining whether there was a breakthrough of lean or rich exhaust gas through the catalyst during said pulse sequence; and c. if a breakthrough is detected, adjusting the air/fuel mixture such that the filling degree is adjusted to be within said set-point interval.

2. A process according to claim 1, further comprising:

a. using an oxygen sensor that is located in the exhaust gas line upstream of the catalyst to vary the composition of the air/fuel mixture supplied to the internal combustion engine; and b. determining whether there was said breakthrough by a second oxygen sensor that is located in the exhaust gas line downstream of the catalyst.

3. A process according to claim 2, wherein the test phase is repeated.

4. A process according to claim 3, wherein a rich/lean pulse sequence follows a lean/rich pulse sequence.

5. A process according to claim 4, wherein said rich/lean pulse sequence and said lean/rich pulse sequence are combined into a single test phase, said single test phase comprising a middle pulse.

6. A process according to claim 5, wherein the duration of the pulse and the height of the pulse in said middle pulse is such that the filling degree after completing the test phase has the same value as the initial value.

7. A process according to claim 4, wherein said oxygen sensor located upstream of the catalyst assists in correcting the filling degree.

8. A process according to claim 4, wherein said air/fuel ratio normalized to stoichiometric conditions ($\lambda$) is varied between two sequential test phases to give a constant value of approximately $\lambda=1$.

9. A process according to claim 4, wherein the air/fuel ratio is modulated with a frequency between 0.1 and 5 Hz and an amplitude of between ±0.1 and ±2.0 between two sequential test phases.

10. A process according to claim 9, wherein the pulse sequences used in the test phases are superimposed on modulation of the air/fuel ratio in line with the phase of the modulation.

11. A process according to claim 9, wherein the duration of the pulse sequences used in the test phases is between 1 and 50% of the period of modulation of the air/fuel ratio and test phase is superimposed on the air/fuel ratio at its turning points.

12. A process according to claim 2, wherein each pulse has a volume and the volume of the pulses is reduced during the working lifetime of the catalyst to adjust it to the shrinking storage capacity of the catalyst.

13. A process according to claim 12, wherein on falling below a minimum volume of pulse sequence, a signal to replace the catalyst is triggered.

14. A process according to claim 2, wherein the pulse sequence is repeated within the test phase.

15. A process for determining whether a filling degree of an oxygen storage component of a catalyst in an internal combustion engine migrates out of a set-point interval, said process comprising:

a. in a first test phase, checking migrations of the filling degree upwards from a set-point interval by subjecting the filling degree to a lean/rich pulse sequence, wherein prior to initiating said first test phase, said filling degree has an initial value;

b. in a second test phase, checking migration of the filling degree downwards from the set-point interval, such that the filling degree starting from the initial value is subject to a rich/lean pulse sequence; and c. in the event of a breakthrough of lean exhaust gas through the catalyst during the lean/rich pulse sequence, enriching the air/fuel mixture to correct the filling degree and in the event of a breakthrough by rich exhaust gas through the catalyst during the rich/lean pulse sequence, reducing the air/fuel mixture in richness, wherein the amount by which the filling degree is increased or reduced during the first test phase or second test phase is such that no breakthrough of lean or rich exhaust gas through the catalyst takes place when the filling degree of the oxygen storage component is within the set-point interval.

16. A process for determining whether a filling degree of an oxygen storage component of a catalyst in an internal combustion engine migrates out of a set-point interval, said process comprising subjecting said catalyst to a lean/rich/lean pulse sequence and that in the event of a breakthrough of lean exhaust gas through the catalyst, the air/fuel mixture is enriched to correct the filling degree and in the event of a breakthrough of rich exhaust gas through the catalyst, the air/fuel mixture is reduced in richness, wherein the amount by which the filling degree is enriched or reduced during the test phase is such that no breakthrough of lean or rich exhaust gas through the catalyst takes place when the filling degree of the oxygen storage component is within the set-point interval.

* * * * *